Aug. 18, 1931.  E. W. DAVIS  1,819,280
LUBRICATING SYSTEM
Filed April 4, 1927
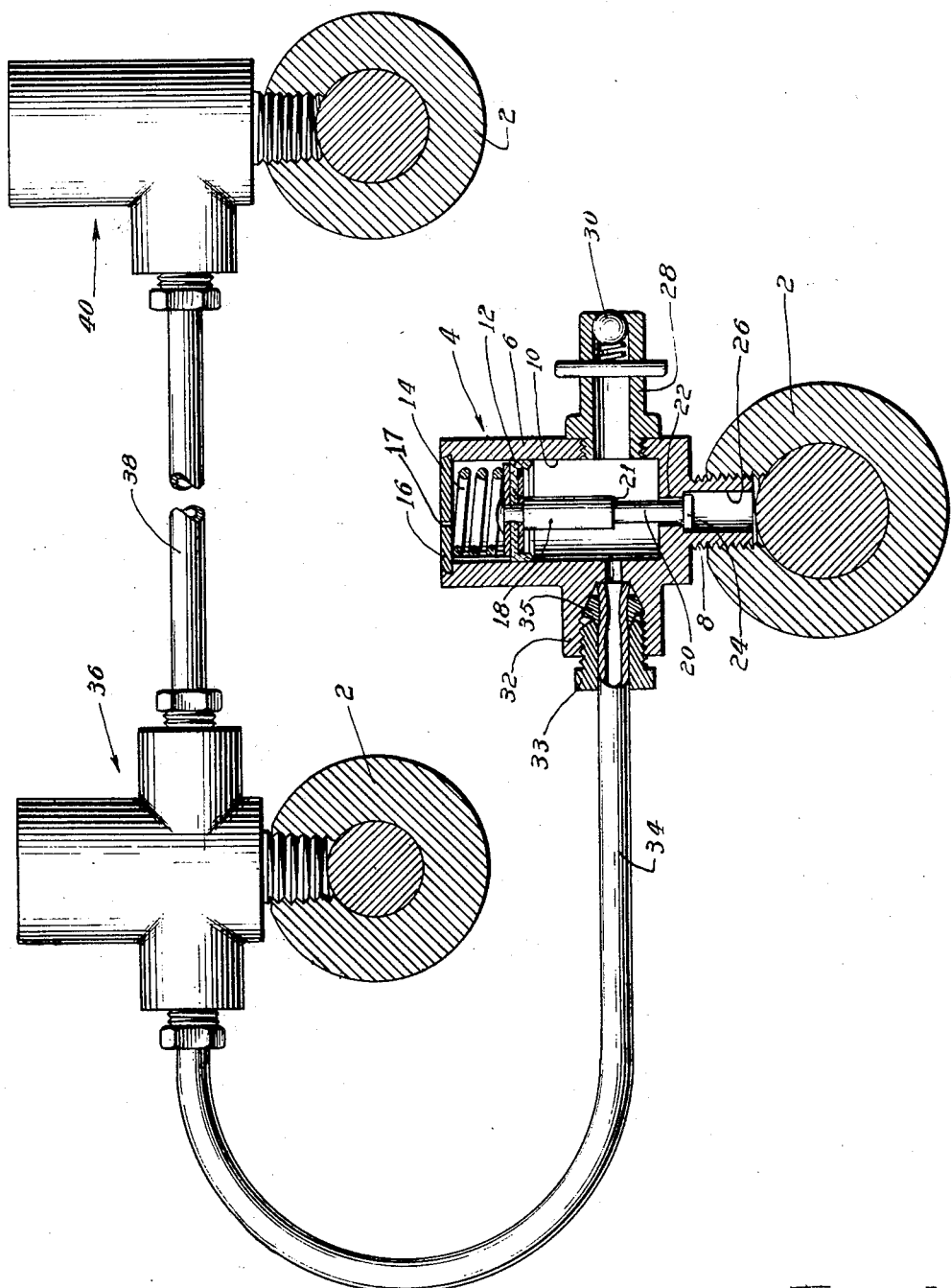
Inventor:
Ernest W. Davis
By: Williams, Bradbury,
McCaleb & Hinkle
Atty's Patented Aug. 18, 1931

1,819,280

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Application filed April 4, 1927. Serial No. 180,751.

My invention relates to lubricating apparatus whereby a plurality of bearings may be supplied with lubricant by making a single connection with the lubricant compressor.

The objects of my invention are:

First: To provide a simple means whereby a plurality of grease cups may be filled with grease under pressure my making the connection with the compressor at one cup only.

Second: To provide a system of lubrication in which a plurality of grease cups are interconnected and in which each cup will receive its full quota of lubricant without the use of a distributing valve or similar device.

Third: To provide a system of lubrication in which a plurality of grease cups are connected by conduits and in which the grease in each cup is maintained under pressure sufficient to force the grease to the bearing only while it is moving but not great enough to force the grease from one cup to another.

Other objects willl appear from the following description, reference being had to the accompanying drawing.

The lubricating system of my invention is particularly adapted for use in the lubrication of the chassis bearings of automotive vehicles but may be used with equal advantage in lubricating other classes of machinery. In adapting the system of my invention for use on an automobile the various bearings may be divided into groups, such as all bearings movable with the front axle, rear axle, etc., each group constituting a unitary system. In this way the necessity for swivel or flexible connections is obviated.

In the drawing I have shown three bearings, which are illustrative of one group, it being understood that a group may consist of practically any desired number of bearings. Each bearing 2 is provided with a lubricant receptacle or grease cup designated generally as 4, comprising a substantially cylindrical body 6, having a threaded extension 8 adapted to be attached to the bearing. The body 6 has a vertical cylindrical bore 10 extending practically its entire length and forming the receptacle for the lubricant. A cup leather piston 12 is urged downwardly by a coiled spring 14 which is confined between the top of the piston and a cover 16 closing the end of the cylindrical bore 10 and having a vent hole 17 formed therein.

A stem 18, riveted to the piston 12, has its lower end of reduced diameter, as indicated at 20, which extends through an outlet port 22 at the lower end of the cylindrical bore 10. The ends of the portion 20 of reduced diameter are defined by a shoulder 21 and head 24 which is threaded or otherwise suitably secured at the extremity of the portion 20. A passage 26 of greater diameter than that of the head 24 leads from the port 22 to the bearing.

A lubricating receiving fitting 28 provided with a ball check valve 30 is threaded in the body 6. This fitting may be of any suitable well-known type whereby grease may be forced into the chamber 10 under high pressure. The body 6 has a cylindrical boss 32 to which a conduit 34 may be connected by any suitable means such as the threaded bushing 33 and the wedging sleeve 35.

The conduit 34 leads to a second lubricant receptacle 36 which is similar to that previously described, except that it does not have the lubricant receiving fitting but instead has a second conduit 38 leading therefrom to a third receptacle 40 which, as shown, is the last bearing of the group.

It will be understood that any number of the receptacles 36 may be connected in series, or if desired receptacles similar to 36 but having additional conduits leading therefrom, may be used, so that any desired arrangement of bearings may have their respective receptacles interconnected by conduits. If two bearings are positioned very close to one another the conduit between them is preferably looped so there will be a conduit of length sufficient to give the desired frictional resistance to flow of grease from one receptacle to the other.

A lubricant, preferably a grease, is forced into the first receptacle 4 by any compressor such as is well-known in the art which may conveniently be attached to the nipple or fitting 28. As the grease enters the chamber 10 it will force the piston 12 upwardly, compressing the spring 14. Its upward movement will be limited by the engagement of the head 24 with the shoulder, which forms a valve seat surrounding the lower end of port 22. While the chamber 10 is being filled, a small amount of grease may pass the bearing through the tubular space between the outlet port 22 and the portion 20 of the stem but as soon as the head 24 abuts against the shoulder as above described communication between the chamber 10 and the passageway 26 is cut off. The spring 14 is relatively weak so that the receptacle 10 will be filled before grease is forced an appreciable distance into the conduit 34. When, however, the chamber 10 has been filled the grease will be forced through the conduit 34 to the next receptacle 36 which in turn will be filled with grease in a similar manner. When the receptacle 36 is full the grease will be forced to the next receptacle and finally reach the terminal receptacle 40. After all of the receptacles have been filled the compressor is detached from the receiving nipple 28. Then when the machine is in operation the pressure of the springs 14 will force the grease from the chambers 10 through the outlet ports 22 to the bearings. The spring 14 does not, however, exert sufficient force upon the piston 12 to cause the grease to flow from one receptacle to another. In other words, the parts are so proportioned for the particular lubricant employed that the resistance to flow through the conduit is greater than the pressure developed in any one of the receptacles.

When grease is used in my improved lubricating system, the pressures developed by the springs 14 are insufficient to force the grease into the bearings of stationary journals. Motion of the journals however lessens the resistance to entrance of the grease into the bearing sufficiently to permit the spring pressed pistons gradually to force grease into the bearings. The grease is thus fed to the bearings only when necessary, thus conserving an appreciable proportion of the grease customarily used in lubrication.

If one of the journals should be abnormally loose in its bearing, so that the receptacle connected to it is entirely discharged while the other receptacles are still substantially full of grease, the shoulder 21 of the discharged receptacle will close the port 22 and preclude the possibility of the loose bearing draining the grease from the adjacent receptacles.

While I have shown and described a system adapted particularly for use with grease it will be apparent that with slight modifications in the size of the conduits and the strength of the springs, a similar system may also be used with heavy oils. This system, however, has peculiar advantages when grease is employed as the lubricant and due to its high viscosity it will not be forced into the bearing except when the journal is in motion, since as above explained, the lubricant pressure developed by the spring 14 is normally insufficient to force grease into a bearing with the usual clearance while the journal is stationary.

It will be apparent to those skilled in the art that modifications and variations of my invention may be made without departing from the principles thereof. I therefore wish the scope of my invention to be limited only by the claims which follow:

I claim:

1. A system of lubrication comprising a plurality of bearings to be lubricated, a lubricant receptacle at each bearing comprising a body having a cylinder, a spring pressed piston therein, an outlet port, a piston rod having spaced shoulders adapted to close said outlet port when said piston is at the ends of its stroke, conduits connecting said receptacles and check valved means for admitting lubricant under pressure to said conduit system.

2. In a system of lubrication the combination of a plurality of bearings to be lubricated, a lubricant receptacle at each bearing, conduits connecting said receptacles, an outlet port leading from each of said receptacles to its bearing, a piston in each of said receptacles, means on one of said receptacles for receiving lubricant under pressure, and means operated by each of said pistons for closing its respective outlet port when its receptacle has been filled with lubricant.

3. In a system of lubrication, the combination of a plurality of bearings to be lubricated, a resilient storage chamber adjacent each bearing, a conduit system connecting said storage chambers in series, means in said conduit system for receiving lubricant under pressure, a passageway from each of said chambers to its adjacent bearing and means for closing each of said passageways when its respective chamber becomes filled with lubricant.

4. In a system of lubrication, the combination of a plurality of bearings to be lubricated, a resilient storage chamber adjacent each bearing, an unrestricted conduit system connecting said storage chambers, means in said conduit system for receiving lubricant under pressure, a passageway from each of said chambers to its adjacent bearing and automatic means for closing each of said passageways when its respective chamber becomes filled with lubricant.

5. In a system of lubrication, the combination of a plurality of bearings to be lubricated, a grease cup adjacent each bearing and having a port leading to the bearing, a spring pressed piston in said cup, means actuated by the piston to close said port when said cup is full of grease, a conduit connecting said grease cups in series, and means for receiving lubricant under pressure secured to one of said cups.

6. A lubricating system comprising a plurality of bearings to be lubricated, a grease cup at each of said bearings, means for receiving lubricant attached to one of said cups, each of said cups having normally open passageway to its respective bearing and a resilient wall, means actuated by said resilient wall for closing said passageway when said cup is filled with lubricant, and open conduits connecting said cups.

7. A lubricating system comprising a plurality of bearings to be lubricated, a resilient storage receptacle connected to each bearing, open conduits connecting said receptacles, the resistance to flow of lubricant in said conduits being sufficiently great to prevent one of the receptacles from forcing lubricant through the conduit to another of said receptacles, and check valved means attached to one of said receptacles for receiving lubricant under pressure.

8. A grease cup comprising a body having a cylinder, a piston reciprocable in said cylinder, resilient means normally urging said piston downwardly, an outlet port at the bottom of said cylinder, and means rigidly connected to said piston for limiting the upward movement of the piston and closing said outlet port when the piston has reached its uppermost position.

9. A grease cup comprising a body having a cylinder, inlet and outlet ports at one end of said cylinder, a spring pressed piston reciprocable in said cylinder, a stem secured to said piston and having a portion of reduced diameter extending through said outlet port, a head secured at the end of said reduced portion, said head being adapted to close said outlet port when said piston is at the end of its stroke.

10. A grease cup comprising a body having a cylinder, an outlet port coaxial therewith, a piston reciprocable in said cylinder, resilient means for urging said piston toward said outlet port, a stem carried by said piston, shoulders on said stem adapted to close said port when the piston is at either end of its stroke and means communicating with said cylinder adjacent said outlet port for receiving lubricant under pressure.

11. A lubricating system comprising a plurality of bearings to be lubricated, a resilient storage receptacle connected to each bearing, open conduits connecting said receptacles at all times, the resistance to flow of lubricant in said conduits being sufficiently great to prevent one of the receptacles from forcing lubricant through the conduit to another of said receptacles, check valved means attached to one of said receptacles for receiving lubricant under pressure, and means to prevent passage of lubricant from each of said receptacles to its associated bearing when the receptacle is completely filled with lubricant under pressure.

12. A lubricating system comprising a plurality of bearings to be lubricated, a resilient storage receptacle connected to each bearing, open conduits connecting said receptacles at all times, the resistance to flow of lubricant in said conduits being sufficiently great to prevent one of the receptacles from forcing lubricant through the conduit to another of said receptacles, check valved means attached to one of said receptacles for receiving lubricant under pressure, and means to prevent passage of lubricant from any one of said receptacles to any other associated bearing when the lubricant has been discharged from that other bearing receptacle.

13. A lubricating system comprising a plurality of bearings to be lubricated, a resilient storage receptacle connected to each bearing, open conduits connecting said receptacles at all times, the resistance to flow of lubricant in said conduits being sufficiently great to prevent one of the receptacles from forcing lubricant through the conduit to another of said receptacles, check valved means attached to one of said receptacles for receiving lubricant under pressure, means to prevent passage of lubricant from each of said receptacles to its associated bearing when the receptacle is completely filled with lubricant under pressure and other means to prevent lubricant from flowing to the bearing from any other source when the lubricant has been discharged from the receptacle.

In witness whereof, I hereunto subscribe my name this 29th day of March, 1927.

ERNEST W. DAVIS.